United States Patent
Cao et al.

(10) Patent No.: US 11,846,853 B2
(45) Date of Patent: Dec. 19, 2023

(54) DISPLAY UNIT AND DISPLAY APPARATUS

(71) Applicants: Chongqing BOE Optoelectronics Technology Co., Ltd., Chongqing (CN); BOE Technology Group Co., Ltd., Beijing (CN)

(72) Inventors: Qi Cao, Beijing (CN); Yong Shu, Beijing (CN); Xinlei Wang, Beijing (CN); Ming Wang, Beijing (CN); Nan Wang, Beijing (CN); Junjie Jiang, Beijing (CN); Xian Wang, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 51 days.

(21) Appl. No.: 17/361,352

(22) Filed: Jun. 29, 2021

(65) Prior Publication Data
US 2022/0179267 A1 Jun. 9, 2022

(30) Foreign Application Priority Data
Dec. 3, 2020 (CN) .......................... 202011412150.5

(51) Int. Cl.
*G02F 1/1362* (2006.01)
*G06F 1/16* (2006.01)

(52) U.S. Cl.
CPC ...... *G02F 1/136204* (2013.01); *G06F 1/1658* (2013.01)

(58) Field of Classification Search
CPC ......... G02F 1/136204; G02F 1/133314; G02F 1/13452; G02F 2202/22; G02F 1/133308;
(Continued)

(56) References Cited

U.S. PATENT DOCUMENTS

| | | | |
|---|---|---|---|
| 6,728,555 B1 * | 4/2004 | Pirila | H05K 9/0067 455/575.8 |
| 2004/0212938 A1 * | 10/2004 | Kao | G11B 33/1493 |
| 2012/0176744 A1 * | 7/2012 | Suzuki | G06F 1/1632 403/345 |

FOREIGN PATENT DOCUMENTS

| | | | |
|---|---|---|---|
| CN | 101093297 A | * | 12/2007 |
| CN | 104864310 A | * | 8/2015 |

(Continued)

OTHER PUBLICATIONS

Zheng Hong, "The Harms of ESD on Electronic Products and Anti-static Design", Enterprise Science And Technology & Development, pp. 47-49, No. 22, 2010(Cumulatively No. 292), China Academic Journal Electronic Publishing House.

*Primary Examiner* — Hoan C Nguyen
(74) *Attorney, Agent, or Firm* — Ling Wu; Stephen Yang; Ling and Yang Intellectual Property

(57) ABSTRACT

Provided are a display unit and a display apparatus, the display unit includes a back plate and a print circuit board disposed on the back plate, wherein the print circuit board is connected to the back plate through a screw, and is provided with a first electrostatic discharge region and a first electrostatic discharge unit; the first electrostatic discharge region is connected to the back plate through the screw to form a first electrostatic discharge channel, and the first electrostatic discharge unit is connected to the back plate to form a second electrostatic discharge channel.

19 Claims, 4 Drawing Sheets

(58) Field of Classification Search
CPC ........... G02F 1/133608; G02F 2201/46; G02F 1/0107; G02F 1/3505; G06F 1/1658; H05K 1/189; H05K 1/147; H05K 3/361; H05K 2201/10128; H05K 1/028; H05K 5/0217; H05K 5/03; H05K 2201/10136; H05K 1/14; H05K 1/181; H05K 5/0204; H05K 1/0215; H05K 1/118; H05K 2201/09063; H05K 5/0004; H05K 1/148; H05K 7/1427; H05K 5/04; H05K 2201/10189; H05K 1/144; H05K 5/00; H05K 2201/10969; H05K 1/11; H05K 1/183; H05K 2201/048; H05K 2201/049; H05K 2201/05; H05K 1/0259; H05K 7/1422; H05K 5/0026; H05K 2201/2036; H05K 2201/2027; H05K 2201/10303; H05K 2201/0999; H05K 9/0037; H05K 1/00; H05K 2201/0715; H05K 2201/10424; H05K 2201/10454; H05K 2201/10484; H05K 2201/10537; H05K 2201/10568; H05K 2201/10606; H05K 2201/10901; H05K 2201/10318; H05K 2201/1031; H05K 2203/1327; H05K 2203/1572; H05K 5/0039; H05K 5/0052; H05K 5/0069; H05K 7/1402; H05K 9/0024; H05K 9/0079; H05K 9/0026; H05K 9/00; H05K 13/0069; H05K 2201/0723; H05K 2201/09445; H05K 2201/0949; H05K 2201/10295; H05K 2201/10257; H05K 2201/10204; H05K 2201/20; H05K 2201/10984; H05K 2203/042; H04N 5/2252; G09G 2300/0426; G09G 2330/06

See application file for complete search history.

(56) References Cited

FOREIGN PATENT DOCUMENTS

| CN | 105786244 | A | * | 7/2016 | ......... G06F 1/13338 |
|----|-----------|---|---|--------|------------------------|
| JP | 2008116495 | A | * | 5/2008 | |
| JP | 2017126732 | A | * | 7/2017 | ............ H05K 7/142 |
| JP | 2019006171 | A | * | 1/2019 | |
| KR | 20090117329 | A | * | 11/2009 | |

* cited by examiner

DISPLAY UNIT AND DISPLAY APPARATUS

CROSS-REFERENCE TO RELATED APPLICATION

The present application claims the priority of Chinese Patent Application No. 202011412150.5 filed to the CNIPA on Dec. 3, 2020, the content of which is hereby incorporated by reference.

TECHNICAL FIELD

Embodiments of the present disclosure relate to, but are not limited to the field of display technology, specifically to a display unit and a display apparatus.

BACKGROUND

The liquid crystal display apparatus is a large-scale display apparatus at present, which has advantages of high color gamut, lightness and fast response time, and has mature technologies in theoretical research and practical processes.

Liquid crystal display (LCD) is a commonly used flat panel display at present, and LCD module is a core display component in LCD. The components in LCD unit are all disposed on Print Circuit Board (abbreviated as flexible print board).

SUMMARY

The following is a summary of subject matters described in detail in the present disclosure. The summary is not intended to limit the protection scope of the claims.

An embodiment of the present disclosure provides a display unit including a back plate and a print circuit board disposed on the back plate, wherein the print circuit board is connected to the back plate through a screw, and is provided with a first electrostatic discharge region and a first electrostatic discharge unit; the first electrostatic discharge region is connected to the back plate through the screw to form a first electrostatic discharge channel, and the first electrostatic discharge unit is connected to the back plate to form a second electrostatic discharge channel.

In an exemplary embodiment, the first electrostatic discharge region is a conduction region on the print circuit board.

In an exemplary embodiment, the back plate is provided with a back light unit, and the back light unit is provided with a second electrostatic discharge unit; the second electrostatic discharge unit is connected to the back plate and the first electrostatic discharge unit is connected to the second electrostatic discharge unit through a first flexible print board; and the first electrostatic discharge unit, the first flexible print board, the second electrostatic discharge unit and the back plate form the second electrostatic discharge channel.

In an exemplary embodiment, the second electrostatic discharge unit includes a second electrostatic discharge region formed on the back light unit, and the second electrostatic discharge region is connected to the back plate.

In an exemplary embodiment, the second electrostatic discharge region is a conduction region on the back light unit.

In an exemplary embodiment, the back light unit further includes a lamp panel and a light emitting unit disposed on the lamp panel, and the second electrostatic discharge unit is disposed on the lamp panel.

In an exemplary embodiment wherein the second electrostatic discharge unit further includes a TVS element disposed on the back light unit, and the first electrostatic discharge unit is connected to the second electrostatic discharge region through the TVS element.

In an exemplary embodiment, the print circuit board is provided with a back light connector; the back light connector is connected to the back light unit through the first flexible print board; the first electrostatic discharge unit includes a first electrostatic discharge pin disposed in the back light connector; and the first electrostatic discharge pin is connected to the second electrostatic discharge unit through the first flexible print board.

In an exemplary embodiment, the back light connector includes a first back light pin, and the first back light pin is connected to the back light unit through the first flexible print board.

In an exemplary embodiment, the back light unit is provided with a gold finger, and the gold finger is provided with a second electrostatic discharge pin; the second electrostatic discharge pin is connected to the second electrostatic discharge unit, and the first flexible print board connects the first electrostatic discharge pin to the second electrostatic discharge pin.

In an exemplary embodiment, the print circuit board is provided with through holes, the back plate is correspondingly provided with a lug; the screw passes through the through holes and is connected to the lug; and the first electrostatic discharge region is disposed around the through holes and is connected to the screw.

In an exemplary embodiment, the through holes are located at corners on both sides of the print circuit board.

In an exemplary embodiment, the screw is a semi-threaded screw to form a moving gap between the print circuit board and the back plate.

In an exemplary embodiment, the first electrostatic discharge unit includes a third electrostatic discharge region formed on the print circuit board, and the third electrostatic discharge region is located in the middle of the print circuit board and is connected to the back plate.

In an exemplary embodiment, the third electrostatic discharge region is a conduction region on the print circuit board.

In an exemplary embodiment, the back plate is provided with a display substrate, and the print circuit board is connected to the display substrate through a second flexible print board.

In an exemplary embodiment, the print circuit board is provided with components, and the components are connected to the first electrostatic discharge region and the first electrostatic discharge unit through ground wires.

An embodiment of the present disclosure further provides a display apparatus which includes any one of the above display unit.

Of course, an implementation of any product or method in the embodiments of the present disclosure does not need to achieve all the advantages mentioned above at the same time. Other features and advantages of the present disclosure will be set forth in the following embodiments of the description, and in part will become apparent from the embodiments of the description, or be learned by practice of the present disclosure. Purposes and other advantages of the technical solutions of the present disclosure may be achieved and acquired by structures specified in the detailed description, claims and drawings.

Other aspects may become apparent upon reading and understanding the accompanying drawings and the detailed description.

BRIEF DESCRIPTION OF DRAWINGS

The attached drawings are for providing a further understanding of the technical scheme of the present disclosure and constitute a part of the description. They are for explaining the technical scheme of the present disclosure together with the embodiments of the present application and do not constitute a limitation on the technical scheme of the present disclosure. Shapes and sizes of each component in the drawings do not reflect true proportions and only to be used to schematically illustrate contents of the present disclosure.

DETAILED DESCRIPTION

Implementations of the present disclosure will be described further in detail below with reference to the accompanying drawings and embodiments. The following embodiments serve to illustrate the present disclosure, but are not intended to limit the scope of the present disclosure. The embodiments and features in the embodiments in the present disclosure may be combined randomly if there is no conflict.

Electro-Static Discharge (ESD) refers to a phenomenon of charge movement between objects with different potentials. The damage of static electricity to electronic components is fatal. Its magnetic field generated around electronic components may cause the components to malfunction, and even lead to loss of life and property. According to relevant statistics, product failure may not be ignored in circuit design.

In an LCD display unit, components on a print circuit board need ESD protection, otherwise it may cause abnormal display of the whole LCD display unit, resulting in huge economic losses.

Generally, LCD display units connect a print circuit board to a back plate through a fully-threaded screw, which connect an electrostatic discharge region on the print circuit board to the back plate, thus realizing an anti-static design of the print circuit board. A back plate of an LCD display unit is provided with a back light unit and a display substrate disposed on the back light unit, and a print circuit board is bonded to the display substrate through a second flexible print board. Since the fully-threaded screw fix the print circuit board and the back plate too tightly, the print circuit board will have no space to move, which limits the movement of the print circuit board. When a client is doing a hinge life test of a whole laptop computer, it is easy to cause stress concentration on the second flexible print board on the print circuit board, making the second flexible print board broken and fractured, and then further resulting in an abnormal display of the LCD display unit.

Figure 1:
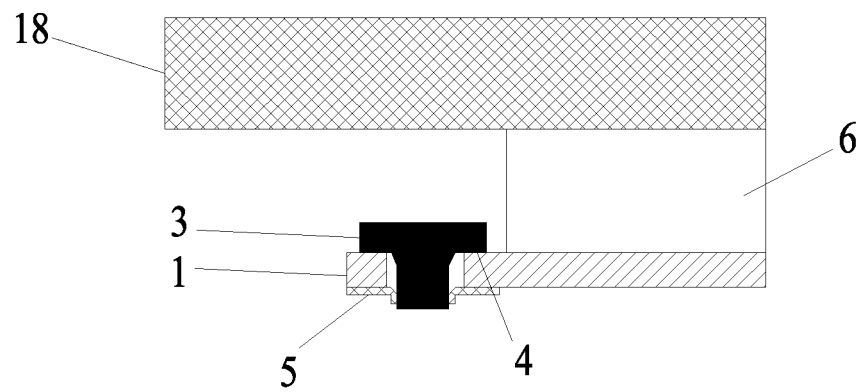
FIG. 1 is a schematic diagram of a structure of a connection between a print circuit board and a back plate.

FIG. 1 is a schematic diagram of a structure of a connection between a print circuit board and a back plate. As shown in FIG. 1, a print circuit board 1 is provided with through holes, and a screw 3 passes through the through hole of the print circuit board 1 and is fixed on a lug 5 of the back plate, thereby fixing the print circuit board 1 on the back plate. A first electrostatic discharge region 4 is disposed around the through holes of the print circuit board 1, the first electrostatic discharge region 4 is connected to a ground wire of components in the print circuit board 1 and is connected to a lug 5 through the screw 3, so that static electricity of components in the print circuit board 1 is discharged to the back plate 2 through the screw 3, thereby realizing a grounding effect of the print circuit board 1. The back plate is provided with a back light unit and a display substrate 18 disposed on the back light unit, and the print circuit board 1 is bonded to the display substrate 18 through a second flexible print board 6. The print circuit board 1 is fully fixed on the back plate by the screw 3, so that the print circuit board 1 has no space to move, which easily leads to stress concentration of the second flexible print board 6, making the second flexible print board 6 broken and fractured, thus affecting a display effect of the display substrate 18. If a gap is formed between the print circuit board 1 and the back plate, so that the second flexible print circuit board 6 has space to move, it will lead to poor contact between the screw 3 and the first electrostatic discharge region 4, which will cause the static electricity on the print circuit board 1 not to be fully discharged to the back plate through the screw 3, resulting in an abnormal display of the display unit.

According to the embodiment of the disclosure, a moving gap is formed between the print circuit board and the back plate by connecting the print circuit board to the back plate by using a semi-threaded screw. When the LCD display unit is undergoing the hinge life test, the moving gap provides space to move for the second flexible print board, thereby preventing the flexible print board from being broken and fractured.

In order to avoid a poor contact between the static electricity discharge region on the print circuit board in a moving state and the screw when the print circuit board is connected to the back plate by using the semi-threaded screw, thus causing the static electricity on the print circuit board not to be fully discharged to the back plate through the screw and leading to the abnormal display of the LCD display unit, the embodiment of the disclosure further provides a display unit including a back plate and a print circuit board disposed on the back plate. The print circuit board is connected to the back plate through a screw, and is provided with a first electrostatic discharge region and a first electrostatic discharge unit, wherein the first electrostatic discharge region is connected to the back plate through the screw to form a first electrostatic discharge channel, and the first electrostatic discharge unit is connected to the back plate to form a second electrostatic discharge channel.

According to the embodiment of the disclosure, the display unit is connected to the back plate through the first electrostatic discharge region to form a first electrostatic discharge channel, and the first electrostatic discharge unit is connected to the back plate to form a second electrostatic discharge channel, so that static electricity in the print circuit board is discharged into the back plate through the first electrostatic discharge channel and the second electrostatic discharge channel to fully discharge the static electricity on the print circuit board and realize electrostatic discharge protection of the print circuit board.

Figure 2:
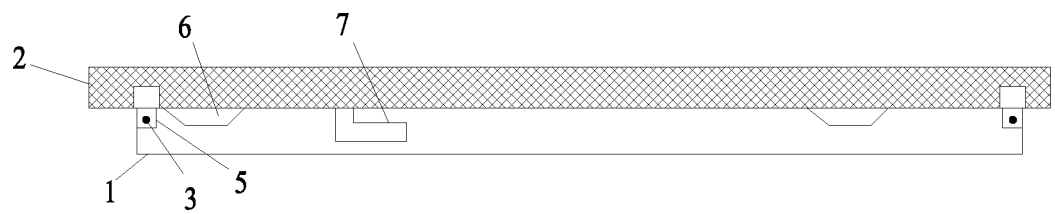
FIG. 2 is a schematic diagram of a structure of a display unit according to an exemplary embodiment of the present disclosure.
Figure 3:
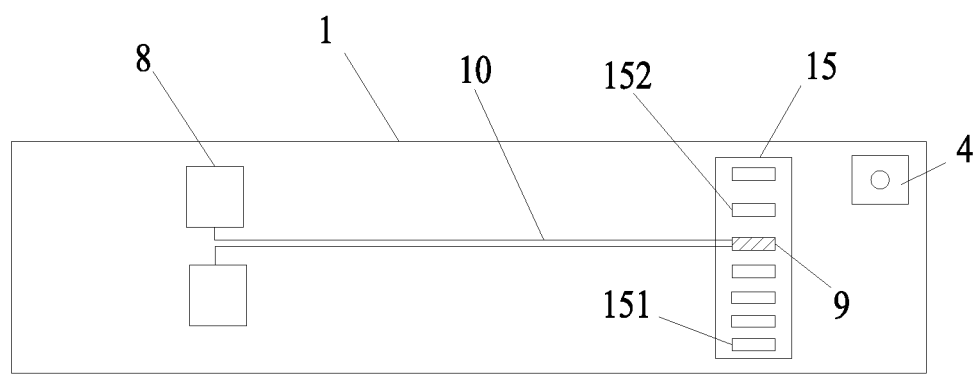
FIG. 3 is a schematic diagram of a structure of a print circuit board in a display unit according to an embodiment of the present disclosure.
Figure 5:
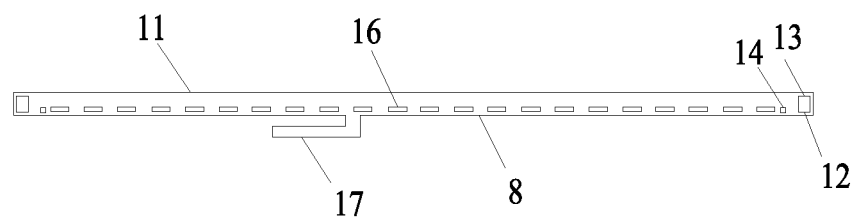
FIG. 5 is a schematic diagram of a structure of a back light unit in a display unit according to an exemplary embodiment of the present disclosure.

FIG. 2 is a schematic diagram of a structure of a display unit according to an exemplary embodiment of the present disclosure; FIG. 3 is a schematic diagram of a structure of a print circuit board in a display unit according to an embodiment of the present disclosure; FIG. 5 is a schematic diagram of a structure of a back light unit in a display unit according to an exemplary embodiment of the present disclosure. As shown in FIG. 2, FIG. 3 and FIG. 5, the display unit according to the embodiment of the present disclosure includes a back plate 2 and a print circuit board 1 disposed on the back plate 2, wherein the print circuit board 1 is connected to the back plate 2 by a screw 3, and the print circuit board 1 is provided with a first electrostatic discharge region 4 and a first electrostatic discharge unit 9. The first electrostatic discharge region 4 is connected to the back plate 2 through the screw 3, so that static electricity on the print circuit board 1 is discharged to the back plate 2 through the first electrostatic discharge region 4 and the screw 3, thereby forming a first electrostatic discharge channel. The first electrostatic discharge unit 9 is connected to the back plate 2 to discharge the static electricity on the print circuit board 1 to the back plate 2 through the first electrostatic discharge unit 9, thereby forming a second electrostatic discharge channel. Wherein, the first electrostatic discharge region 4 may be a conduction region on the print circuit board 1, for example, the first electrostatic discharge region 4 is a copper exposed region on the print circuit board 1.

Figure 4:
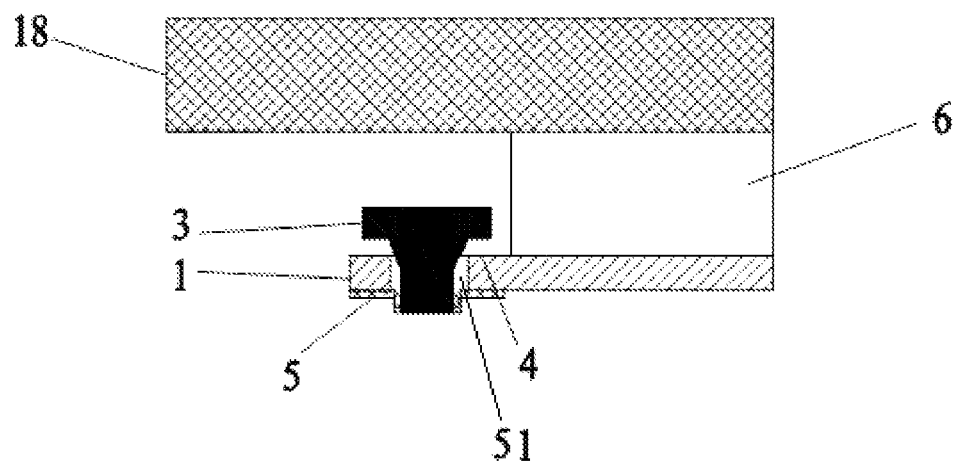
FIG. 4 is a sectional view of a display unit according to an embodiment of the present disclosure.

FIG. 4 is a sectional view of a display unit according to an embodiment of the present disclosure; As shown in FIG. 2, FIG. 3, FIG. 4 and FIG. 5, the back plate 2 is provided with the back light unit 11 and the display substrate 18, and the display substrate 18 is configured to display images; the back light unit 11 is configured to provide back light to the display substrate 18. The print circuit board 1 is connected to the back light unit 11 through a first flexible print board 7, and the print circuit board 1 is connected to the display substrate 18 through a second flexible print board 6. The back light unit 11 is provided with a second electrostatic discharge unit 12, which is connected to the back plate 2. The first electrostatic discharge unit 9 is connected to the second electrostatic discharge unit 12 on the back light unit 11 through the first flexible print board 7, so that the static electricity on the print circuit board 1 is discharged to the back plate 2 through the first electrostatic discharge unit 9, the first flexible print board 7, the second electrostatic discharge unit 12 in turn; the first electrostatic discharge unit 9, the first flexible print board 7, the second electrostatic discharge unit 12, and the back plate 2 form a second electrostatic discharge channel. Wherein, the second electrostatic discharge unit 12 includes a second electrostatic discharge region 13 formed on the back light unit 11. The second electrostatic discharge region 13 may be a conduction region on the back light unit 11, for example, the second electrostatic discharge region 13 is a copper exposed region on the back light unit 11. The second electrostatic discharge region 13 may be connected to the back plate 2 by the screw or other conductive structures.

As shown in FIG. 5, the back light unit 11 includes a lamp panel 8, a light emitting unit 16 and a second electrostatic discharge unit 12 disposed on the lamp panel 8, and the second electrostatic discharge unit 12 includes a second electrostatic discharge region 13 formed on the lamp panel 8.

In an exemplary embodiment, the second electrostatic discharge unit 12 further includes a TVS (Transient Voltage Suppressor) element 14 disposed on the lamp panel 8, and the first electrostatic discharge unit 9 is connected to the second electrostatic discharge region 13 through the TVS element 14. The TVS element 14 is configured to prevent the light emitting unit 16 from being broken down by static electricity and protect the light emitting unit 16 from the static electricity.

As shown in FIGS. 2, 3 and 5, the print circuit board 1 is provided with a back light connector 15, and the first flexible print board 7 is a back light flexible print board, which connects the back light connector 15 to the back light unit 11. The back light connector 15 includes a plurality of first back light pins 151 (there are four in this example) and a plurality of voltage output pins 152 (there are two in this example) formed on the print circuit board 1. The first flexible print board 7 is a back light flexible print board. The first back light pin 151 is connected to a light emitting unit in the back light unit 11 through the first flexible print board 7. The first electrostatic discharge unit 9 is a first electrostatic discharge pin located in the back light connector 15. The first electrostatic discharge pin is connected to the second electrostatic discharge unit 12 in the back light unit 11 through the first flexible print board 7, thereby discharging static electricity on the print circuit board 1 to the back plate 2 through the second electrostatic discharge unit 12.

Figure 8:
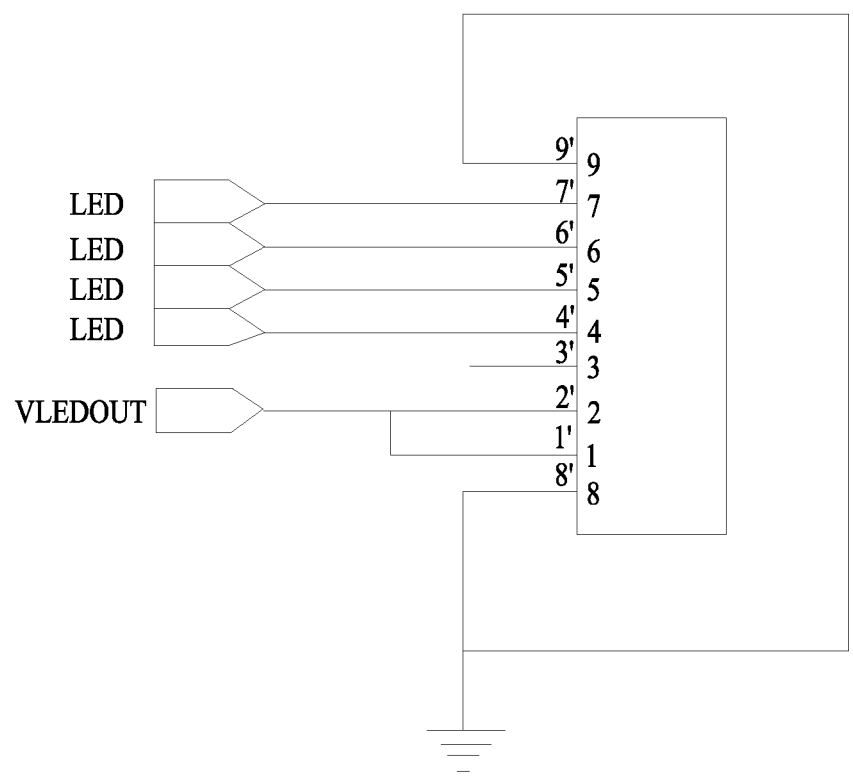
FIG. 8 is a circuit diagram of a back light connector in a display unit according to an embodiment of the present disclosure.

FIG. 8 is a circuit diagram of a back light connector in a display unit according to an embodiment of the present disclosure. As shown in FIG. 8, the back light connector is provided with pin 1', pin 2', pin 3', pin 4', pin 5', pin 6' and pin 7', wherein, the pin 1' and pin 2' are voltage output pins; the pin 4', pin 5', pin 6' and pin 7' are first back light pins, which are configured to be connected to the light emitting units in the back light unit; the pin 3' is a first electrostatic discharge pin, which is configured to be connected to the second electrostatic discharge unit in the back light unit.

Figure 6:
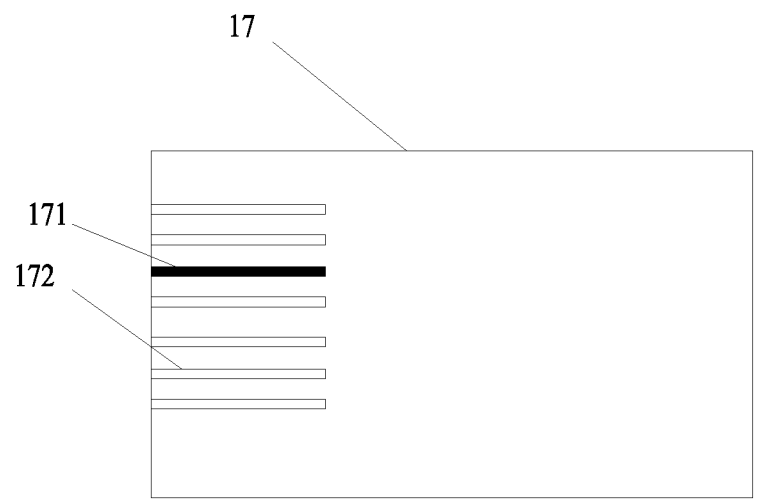
FIG. 6 is a schematic diagram of a structure of a gold finger in a display unit according to an embodiment of the present disclosure.
Figure 7:
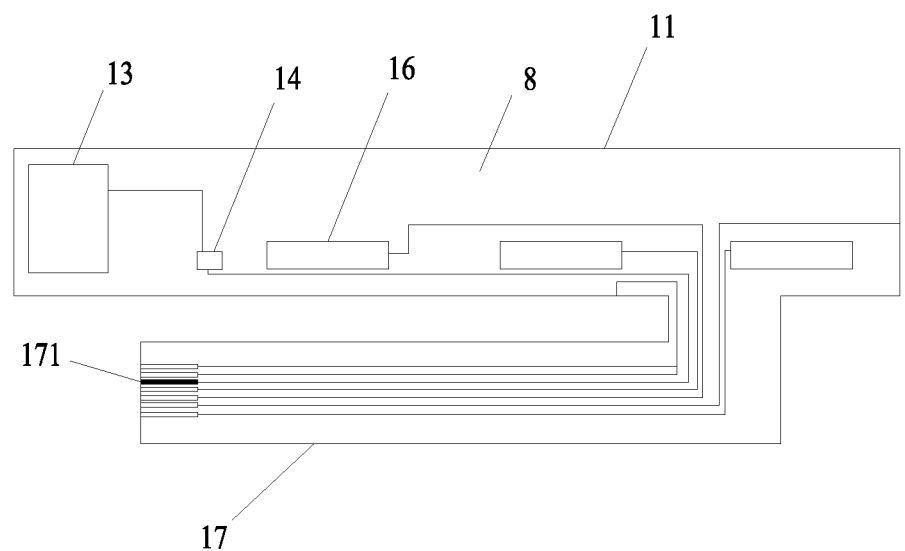
FIG. 7 is a schematic diagram of a structure of a connection between a gold finger and a back light unit in a display unit according to an embodiment of the present disclosure.

FIG. 6 is a schematic diagram of a structure of a gold finger in a display unit according to an embodiment of the present disclosure; FIG. 7 is a schematic diagram of a structure of a connection between a gold finger and a back light unit in a display unit according to an embodiment of the present disclosure. As shown in FIGS. 6 and 7, the back light unit 11 is provided with a gold finger 17, and the gold finger 17 is connected to the lamp panel 8. The gold finger 17 is provided with a second electrostatic discharge pin 171 and second back light pins 172 one-to-one corresponding to the first back light pins and the voltage output pins in the back light connector 15. The second electrostatic discharge pin 171 is connected to the TVS element 14 on the lamp panel 8, and the second back light pin 172 is connected to the light emitting unit 16 on the lamp panel 8. The back light connector 15 on the print circuit board 1 is connected to the gold finger 17 through the first flexible print board 7. The first electrostatic discharge pin in the back light connector 15 is connected to the TVS element 14 on the lamp panel 8 through the second electrostatic discharge pin 171, and then connected to the second electrostatic discharge region 13 through the TVS element 14 to form a second electrostatic discharge channel. The first back light pin 151 in the back light connector 15 is connected to the light emitting unit 16 on the lamp panel 8 through the second back light pin 172.

In the embodiment of the present disclosure, static electricity on the print circuit board 1 is discharged to the back plate 2 through the first electrostatic discharge pin, the first flexible print board 7, the second electrostatic discharge pin 171, the TVS element 14 and the second electrostatic discharge region 13 in turn to forming a second electrostatic discharge channel.

According to the embodiment of the present disclosure, the second electrostatic discharge channel is integrated with the back light unit 11, and a connection channel between the print circuit board 1 and the back light unit 11 is used as a second electrostatic discharge channel, so that design complexity is reduced, reliability of the design is ensured, a hidden danger of incomplete electrostatic discharge of the print circuit board 1 is thoroughly solved, the hinge test of the LCD display unit is ensured to pass and the project schedule is not affected by ESD, thereby greatly improving the yield of the LCD display unit. The embodiment of the disclosure may reduce a risk of ESD failure, effectively discharge static electricity without being interfered by other signals, and realize an extremely narrow PCB design.

According to the embodiment of the present disclosure, the first electrostatic discharge unit 9 is disposed in the back light connector 15, and then static electricity is transmitted to the second electrostatic discharge unit 12 on the back light unit through a back light flexible print board, i.e., the first flexible print board 7, without making holes on the print circuit board 1 to form an electrostatic discharge region, thus ensuring an intensity of the print circuit board 1 without occupying space of the print circuit board 1.

As shown in FIG. 4, the print circuit board 1 is provided with through holes, and the back plate is correspondingly provided with a lug 5, and the screw 3 passes through the through holes of the print circuit board 1 and is connected to the lug 5. The first electrostatic discharge region 4 is disposed all around the through holes on the print circuit board 1, and at least part of the screw 3 contacts the first electrostatic discharge region 4, so that the screw 3 is connected to the first electrostatic discharge region 4. The first electrostatic discharge region 4, the screw 3 and the back plate 2 form a first electrostatic discharge channel. The first electrostatic discharge region 4 is connected to the back plate 2 by the screw 3, so that static electricity on the print circuit board 1 is discharged to the back plate 2 through the first electrostatic discharge region 4.

In an exemplary embodiment, through holes may be located at corners on both sides of a print circuit board.

As shown in FIG. 4, the back plate is provided with a display substrate 18, and the print circuit board 1 is bonded to the display substrate 18 through a second flexible print board 6. The screw 3 is a semi-threaded screw, so that a moving gap 51 is formed between the print circuit board 1 and the lug 5, thereby providing space to move for the second flexible print board 6 and preventing the second flexible print board 6 from being damaged.

As shown in FIG. 3, the print circuit board 1 is provided with at least one component 8, each component 8 is connected to a ground wire 10, and each component 8 is connected to the first electrostatic discharge region 4 and the first electrostatic discharge unit 9 through the ground wire 10.

In an exemplary embodiment, a first electrostatic discharge unit on the print circuit board may be a third electrostatic discharge region formed on the print circuit board, a third electrostatic discharge region is located in the middle of the print circuit board, and may be connected to the back plate by a screw or other conductive structures to form a second electrostatic discharge channel. Static electricity on the print circuit board is discharged to the back plate through the first electrostatic discharge region and the third electrostatic discharge region to ensure that static electricity on the print circuit board is fully discharged. Wherein, the third electrostatic discharge region may be a conduction region on the print circuit board, for example, the third electrostatic discharge region is a copper exposed region on the print circuit board.

An embodiment of the present disclosure further provides a display apparatus which includes the display unit of the aforementioned embodiments. The display apparatus may be any product or component with a display function, such as a mobile phone, a tablet computer, a television, a display, a laptop computer, a digital photo frame, a navigator, etc.

In the description of embodiments of the present disclosure, orientation or positional relationships indicated by terms "middle", "upper", "lower", "front", "back", "vertical", "horizontal", "top", "bottom", "inside", "outside" and the like are based on the orientation or positional relationships shown in the drawings, and are for the purpose of ease of description of the present disclosure and simplification of the description only, but are not intended to indicate or imply that the mentioned apparatus or element must have a specific orientation, or be constructed and operated in a particular orientation, and therefore they should not be construed as limitation to the present disclosure.

In the description of the embodiments of the present disclosure, unless otherwise clearly specified and defined, the terms "install", "couple", "connect" should be broadly interpreted, for example, it may be a fixed connection, or a detachable connection, or an integrated connection; it may be a mechanical connection or an electrical connection; it may be a direct connection, or may be an indirect connection through an intermediary, or may be an internal connection between two elements. Those of ordinary skills in the art may understand the specific meanings of the above terms in the present disclosure according to situations.

Although the implementations disclosed in the present disclosure are described above, the described contents are only the implementations for facilitating understanding of the present disclosure, and are not intended to limit the present disclosure. Any person skilled in the art to which the present disclosure pertains may make any modifications and variations in the form and details of implementation without departing from the spirit and scope of the present disclosure. Nevertheless, the scope of patent protection of the present disclosure shall still be determined by the scope defined by the appended claims.

What we claim is:

1. A display unit, comprising a first flexible print board, a back plate and a print circuit board disposed on the back plate, wherein
   the print circuit board is connected to the back plate through a screw, and is provided with a first electrostatic discharge region and a first electrostatic discharge unit; and
   the first electrostatic discharge region is connected to the back plate through the screw to form a first electrostatic discharge channel, and the first electrostatic discharge unit is connected to the back plate to form a second electrostatic discharge channel;

wherein the screw is a semi-threaded screw to form a moving gap between the print circuit board and the back plate;

wherein the first electrostatic discharge unit comprises a first electrostatic discharge pin;

the back plate is provided with a back light unit, and the back light unit is provided with a second electrostatic discharge unit;

the second electrostatic discharge unit comprises a transient voltage suppression (TVS) element disposed on the back light unit, and a second electrostatic discharge region formed on the back light unit;

the back light unit is provided with a gold finger, and the gold finger is provided with a second electrostatic discharge pin;

the first electrostatic discharge region and the first electrostatic discharge unit are separated and disconnected;

static electricity on the print circuit board is discharged to the back plate through the first electrostatic discharge pin, the first flexible print board, the second electrostatic discharge pin, the TVS element and the second electrostatic discharge region in turn to forming the second electrostatic discharge channel.

2. The display unit of claim 1, wherein the first electrostatic discharge region is a conduction region on the print circuit board.

3. The display unit of claim 1, wherein
the second electrostatic discharge unit is connected to the back plate and the first electrostatic discharge unit is connected to the second electrostatic discharge unit through the first flexible print board.

4. The display unit of claim 3, wherein the second electrostatic discharge region is connected to the back plate.

5. The display unit according to claim 4, wherein the second electrostatic discharge region is a conduction region on the back light unit.

6. The display unit of claim 3, wherein the back light unit further comprises a lamp panel and a light emitting unit disposed on the lamp panel, and the second electrostatic discharge unit is disposed on the lamp panel.

7. The display unit of claim 4, wherein the first electrostatic discharge unit is connected to the second electrostatic discharge region through the TVS element.

8. The display unit of claim 3, wherein
the print circuit board is provided with a back light connector;
the back light connector is connected to the back light unit through the first flexible print board;
the first electrostatic discharge unit comprises the first electrostatic discharge pin disposed in the back light connector; and
the first electrostatic discharge pin is connected to the second electrostatic discharge unit through the first flexible print board.

9. The display unit of claim 8, wherein the back light connector comprises a first back light pin, and the first back light pin is connected to the back light unit through the first flexible print board.

10. The display unit of claim 8, wherein
the second electrostatic discharge pin is connected to the second electrostatic discharge unit, and the first flexible print board connects the first electrostatic discharge pin to the second electrostatic discharge pin.

11. The display unit of claim 1, wherein
the print circuit board is provided with through holes, the back plate is correspondingly provided with a lug;
the screw passes through the through holes and is connected to the lug; and
the first electrostatic discharge region is disposed around the through holes and is connected to the screw.

12. The display unit of claim 11, wherein the through holes are located at corners on both sides of the print circuit board.

13. The display unit of claim 1, wherein the first electrostatic discharge unit comprises a third electrostatic discharge region formed on the print circuit board, and the third electrostatic discharge region is located in the middle of the print circuit board and is connected to the back plate.

14. The display unit of claim 13, wherein the third electrostatic discharge region is a conduction region on the print circuit board.

15. The display unit of claim 1, wherein the back plate is provided with a display substrate, and the print circuit board is connected to the display substrate through a second flexible print board.

16. The display unit of claim 1, wherein the print circuit board is provided with components, and the components are connected to the first electrostatic discharge region and the first electrostatic discharge unit through ground wires.

17. A display apparatus, comprising a display unit, wherein
the display unit comprises a back plate and a print circuit board disposed on the back plate;
the print circuit board is connected to the back plate through a screw, and is provided with a first electrostatic discharge region and a first electrostatic discharge unit; and
the first electrostatic discharge region is connected to the back plate through the screw to form a first electrostatic discharge channel, and the first electrostatic discharge unit is connected to the back plate to form a second electrostatic discharge channel;
wherein the screw is a semi-threaded screw to form a moving gap between the print circuit board and the back plate;
wherein the first electrostatic discharge unit comprises a first electrostatic discharge pin;
the back plate is provided with a back light unit, and the back light unit is provided with a second electrostatic discharge unit;
the second electrostatic discharge unit comprises a transient voltage suppression (TVS) element disposed on the back light unit, and a second electrostatic discharge region formed on the back light unit;
the back light unit is provided with a gold finger, and the gold finger is provided with a second electrostatic discharge pin;
the first electrostatic discharge region and the first electrostatic discharge unit are separated and disconnected;
static electricity on the print circuit board is discharged to the back plate through the first electrostatic discharge pin, the first flexible print board, the second electrostatic discharge pin, the TVS element and the second electrostatic discharge region in turn to forming the second electrostatic discharge channel.

18. The display apparatus of claim 17, wherein
the second electrostatic discharge unit is connected to the back plate and the first electrostatic discharge unit is connected to the second electrostatic discharge unit through a first flexible print board.

19. The display apparatus of claim 17, wherein
the print circuit board is provided with through holes, and the back plate is correspondingly provided with a lug;

the screw passes through the through holes and is connected to the lug; and the first electrostatic discharge region is disposed around the through holes and is connected to the screw.

* * * * *